(12) United States Patent
Tada

(10) Patent No.: US 8,660,284 B2
(45) Date of Patent: Feb. 25, 2014

(54) HEARING AID

(75) Inventor: Minoru Tada, Ehime (JP)

(73) Assignee: Panasonic Corporation, Osaka (JP)

( * ) Notice: Subject to any disclaimer, the term of this patent is extended or adjusted under 35 U.S.C. 154(b) by 0 days.

(21) Appl. No.: 13/579,161

(22) PCT Filed: Jan. 5, 2012

(86) PCT No.: PCT/JP2012/000018
§ 371 (c)(1),
(2), (4) Date: Aug. 15, 2012

(87) PCT Pub. No.: WO2012/093655
PCT Pub. Date: Jul. 12, 2012

(65) Prior Publication Data
US 2013/0004003 A1    Jan. 3, 2013

(30) Foreign Application Priority Data

Jan. 7, 2011   (JP) .................................. 2011-001753

(51) Int. Cl.
*H04R 25/00*    (2006.01)
(52) U.S. Cl.
USPC .......................................... 381/323; 381/330
(58) Field of Classification Search
USPC ......... 381/323, 312, 322, 314, 324, 330, 327, 381/380, 381
See application file for complete search history.

(56) References Cited

U.S. PATENT DOCUMENTS

| 5,347,584 A | 9/1994 | Narisawa |
| 6,475,658 B1 | 11/2002 | Pedicini et al. |
| 2001/0002300 A1 | 5/2001 | Tinker et al. |
| 2011/0188688 A1 | 8/2011 | Onodera |
| 2013/0195303 A1* | 8/2013 | Tada ............................. 381/323 |

FOREIGN PATENT DOCUMENTS

| GB | 2 261 108 | 5/1993 |
| JP | 59-228355 | 12/1984 |
| JP | 5-130011 | 5/1993 |

(Continued)

OTHER PUBLICATIONS

Supplementary European Search Report issued Nov. 8, 2012 in corresponding European Application No. EP 12 73 2427.

(Continued)

*Primary Examiner* — Mohammad Islam
*Assistant Examiner* — Phylesha Dabney
(74) *Attorney, Agent, or Firm* — Wenderoth, Lind & Ponack, L.L.P.

(57) ABSTRACT

This hearing aid comprises a main body case (1), a battery case (7) provided so that it can be pulled from inside the main body case (1) to outside of the main body case (1), a control device (14) that is actuated by electromotive force of an air battery (8) housed in the battery case (7), a microphone (4) and speaker (3) electrically connected to the control device (14), and a switching portion for cutting off power from the air battery (8) to the control device (14) in conjunction with manipulation that pulls at least part of the battery case (7) out of the main body case (1). A magnet (11) that blocks off air holes (10) in the air battery (8) is provided to the bottom part of the (7). The magnet (11) closes off the air holes (10) in conjunction with manipulation that pulls at least part of the battery case (7) out of the main body case (1).

5 Claims, 8 Drawing Sheets

(56) References Cited

FOREIGN PATENT DOCUMENTS

| | | |
|---|---|---|
| JP | 8-84399 | 3/1996 |
| JP | 2001-238296 | 8/2001 |
| JP | 2001-325997 | 11/2001 |
| JP | 2002-532859 | 10/2002 |
| JP | 2002-533879 | 10/2002 |
| JP | 2003-297440 | 10/2003 |
| JP | 2005-129296 | 5/2005 |
| JP | 4750230 | 8/2011 |
| WO | 00/36696 | 6/2000 |
| WO | 2011/048755 | 4/2011 |

OTHER PUBLICATIONS

International Search Report issued Apr. 3, 2012 in International (PCT) Application No. PCT/JP2012/000018.

Written Opinion of the International Searching Authority issued Apr. 3, 2012 in International (PCT) Application No. PCT/JP2012/000018.

* cited by examiner

HEARING AID

TECHNICAL FIELD

The present invention relates to a hearing aid equipped with an air battery.

BACKGROUND ART

A conventional hearing aid comprises a main body case, a battery case provided so that it can be pulled from inside the main body case to outside of the main body case, a control device that is actuated by electromotive force of an air battery housed in the battery case, a microphone and speaker electrically connected to the control device, and a switching portion for cutting off power from the air battery to the control device when the battery case is pulled out of the main body case.

When a hearing aid such as this is in its storage state, that is, when it has been removed from the ear at bedtime, for example, the design is such that when the battery case is pulled out of the main body case after the hearing aid is removed from the ear, a switching portion cuts off the power from the air battery to the control device.

Even when the switching portion cuts off the power from the air battery to the control device here, the air holes in the air battery are still open, and the chemical reaction with oxygen continues, so the battery capacity gradually decreases.

Patent Literature 1, for example, discloses a technique for extending the life of an air battery by using a cover to open and close the air holes of the air battery, and opening and closing the switching portion with a manipulation component provided to the outer face of the main body case.

CITATION LIST

Patent Literature

Patent Literature 1: Japanese Laid-Open Patent Application S59-228355

SUMMARY

When the technique disclosed in the above-mentioned Patent Literature 1 is applied to a hearing aid, the manipulation component is provided to the outer face of the main body case.

Since a hearing aid needs to be made more compact, this manipulation component also ends up being very small.

However, most hearing aid users are elderly, and it is difficult for them to operate such a small manipulation component, and as a result the hearing aid ends up being difficult to operate.

In view of this, it is an object of the present invention to provide a hearing aid that is easier to operate.

To achieve the stated object, the present invention comprises a main body case, a battery case, a control device, a microphone and speaker, a switching portion, a magnet, and a protrusion. The battery case is provided so that it can be pulled from inside the main body case to outside of the main body case, and houses an air battery. The control device is actuated by the electromotive force of the air battery housed in the battery case. The microphone and speaker are electrically connected to the control device. The switching portion cuts off the supply of electrical power from the air battery to the control device in conjunction with manipulation that pulls at least part of the battery case out of the main body case. The magnet is provided to close off the air holes of the air battery in conjunction with manipulation that pulls at least part of the battery case out of the main body case. The protrusion biases the air battery away from the magnet in a state in which the battery case is housed in the main body case.

Advantageous Effects

With the present invention, power from the air battery to the control device can be cut off by the switching portion, and the air holes in the air battery can be covered by a lid by magnetic force from the magnet, merely by pulling at least part of the battery case, which is large enough to be grasped with the fingers, out of the main body case, so a decrease in the capacity of the air battery can be suppressed, and the hearing aid is more convenient to operate when being put away.

DESCRIPTION OF EMBODIMENTS

The hearing aid pertaining to an embodiment of the present invention will now be described through reference to FIGS. 1 to 6.

Embodiment 1

Figure 1:
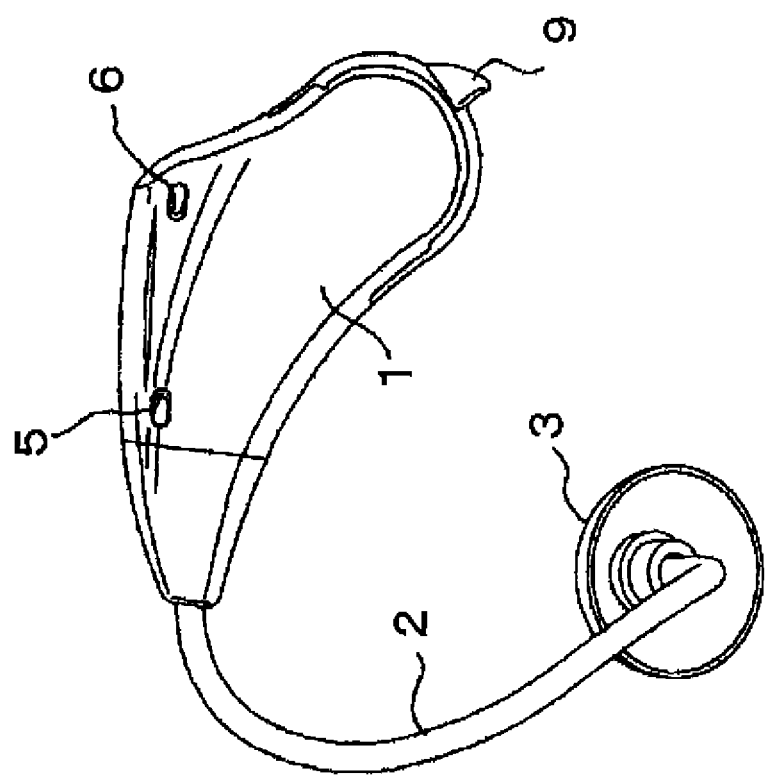
FIG. 1 is a front view of the hearing aid pertaining to an embodiment of the present invention.

As shown in FIG. 1, the hearing aid in this embodiment is a behind-the-ear (BTE) type of hearing aid, comprising a main body case 1 that is worn behind the ear, an ear hook 2 that is linked at one end to the upper end of the main body case 1, and a speaker 3 that is linked to the other end of the ear hook 2.

Openings 5 and 6 for a microphone 4 (see FIG. 3) are provided at the upper and lower parts in the approximate middle of the main body case 1.

Figure 2:
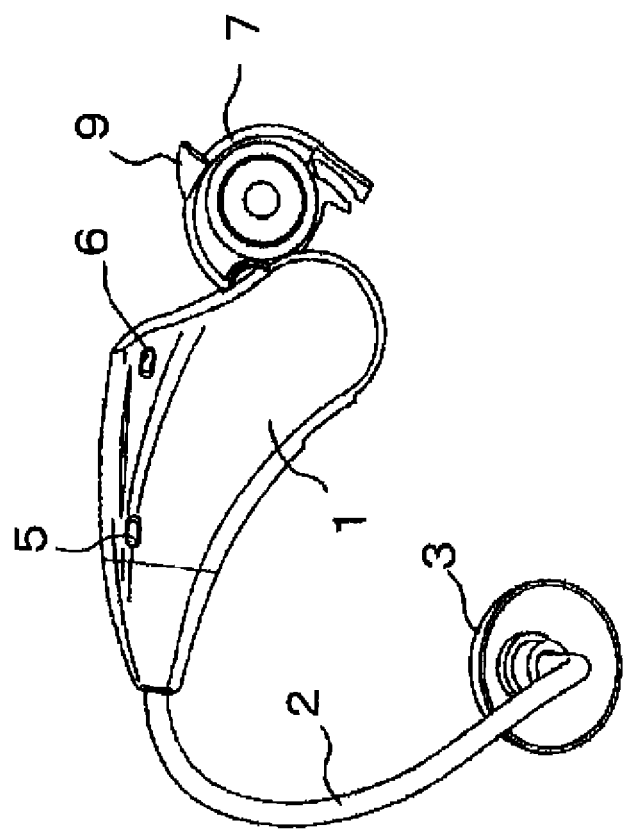
FIG. 2 is a front view of the state when the battery case of the hearing aid in FIG. 1 has been opened.

As shown in FIG. 2, a battery case 7 is provided inside the lower end of the main body case 1 in a state that allows it to be pulled out of the main body case 1.

Figure 5:
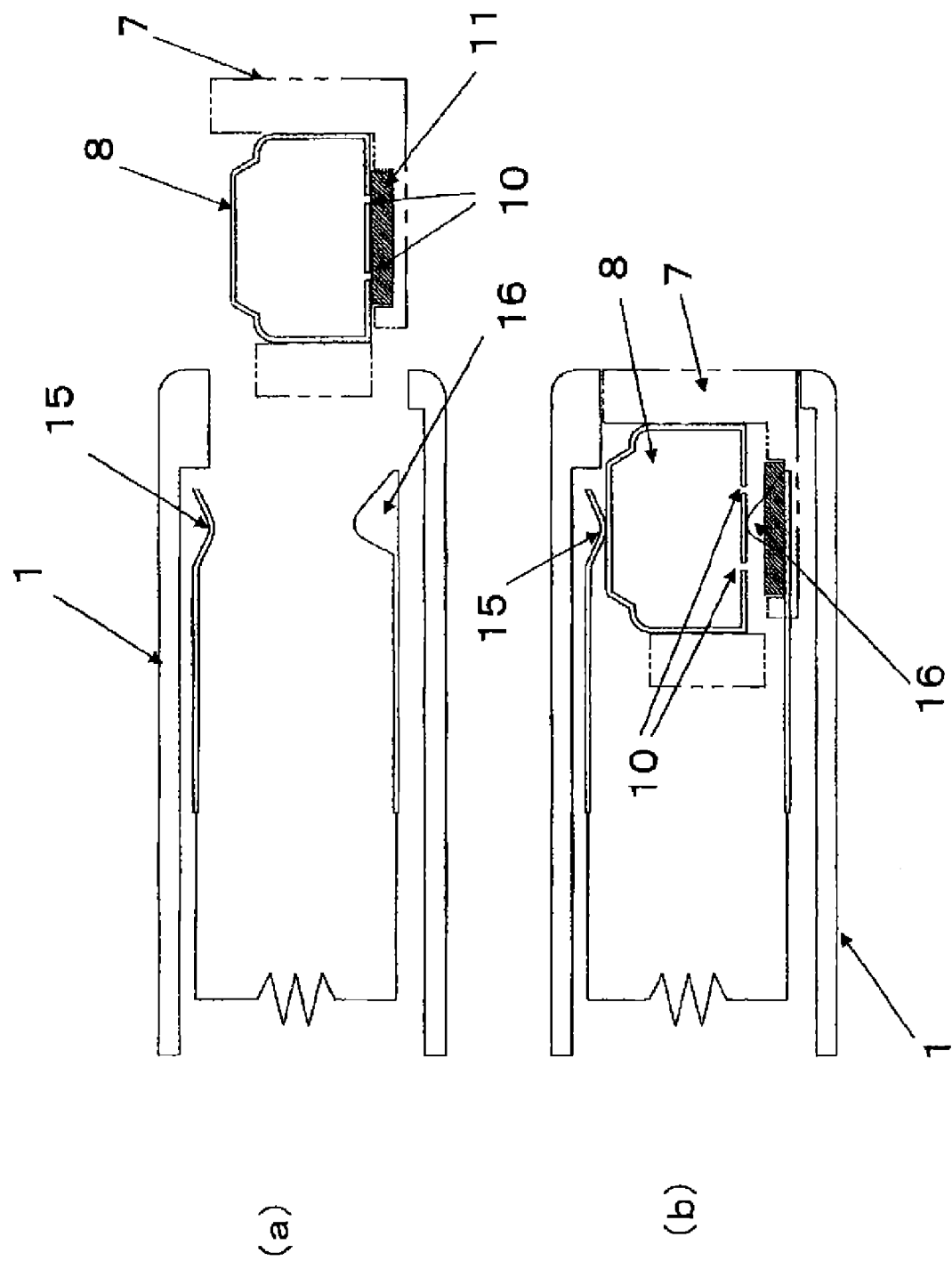
FIG. 5 is a configuration diagram of the operating state of the hearing aid in FIG. 1.

As shown in FIGS. 2 and 5, the battery case 7 is in the form of a container that is open on one side (the far side in FIG. 2), and an air battery 8 is housed inside this.

The battery case 7 can rotate around a rotational shaft (not shown) from the hearing aid usage state shown in FIGS. 1 and 5b to the battery replacement state shown in FIGS. 2 and 5a.

When the battery case 7 is changed from the hearing aid usage state shown in FIGS. 1 and 5b to the state shown in FIGS. 2 and 5a in which it is pulled out of the main body case 1 in order to replace the air battery 8, a lever 9 shown in FIG. 1 is pushed to the right side in FIG. 1.

Consequently, after part of the battery case 7 has been pulled out of the main body case 1, the lever 9 or part of the battery case 7 exposed outside the main body case 1 is grasped and the battery case 7 is rotated to the position shown in FIGS. 2 and 5a, and in this state the air battery 8 is replaced.

Figure 4:
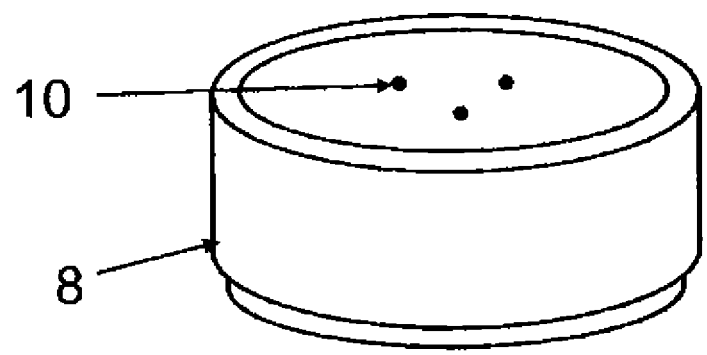
FIG. 4 is an oblique view of the air battery mounted to the hearing aid in FIG. 1.

The air battery 8 is in the form of a disk as shown in FIG. 4, and a plurality of air holes 10 are provided on one side thereof (the positive pole side). As shown in FIGS. 5a and 5b, the air battery 8 is housed so that the side with the air holes 10 is in contact with the bottom side of the battery case 7. In the stowed state shown in FIGS. 5a and 5b, a magnet 11 is provided in a fixed state on the bottom face side in the battery case 7.

The magnet 11 is large enough to cover all of the plurality of air holes 10 provided to the air battery 8, and in a state in which the battery case 7 has been pulled out (FIG. 5a), the air battery 8 sticks to the magnet 11 and the air holes 10 are blocked off by the magnet 11.

Specifically, in a state in which the hearing aid is not being used (FIG. 5a), the air holes 10 are blocked off by the magnet 11, and this prevents the air battery 8 from generating power. Thus, the hearing aid can be put away without removing the air battery 8. The magnet 11 is preferably made of a soft or elastic material.

In the hearing aid usage state shown in FIG. 5b, power is sent to a control device 14 (see FIG. 3) that drives the hearing aid, by an electrical contact 15 that touches the negative pole of the air battery 8 and an electrical contact 16 that touches the positive pole, and this puts the hearing aid in its operating state.

The electrical contact 16 here pulls the air battery 8 away from the magnet 11 by biasing the air battery 8 to the electrical contact 15 side. Consequently, the air holes 10 are opened, air is supplied to the air battery 8, and power generation begins.

Figure 6:
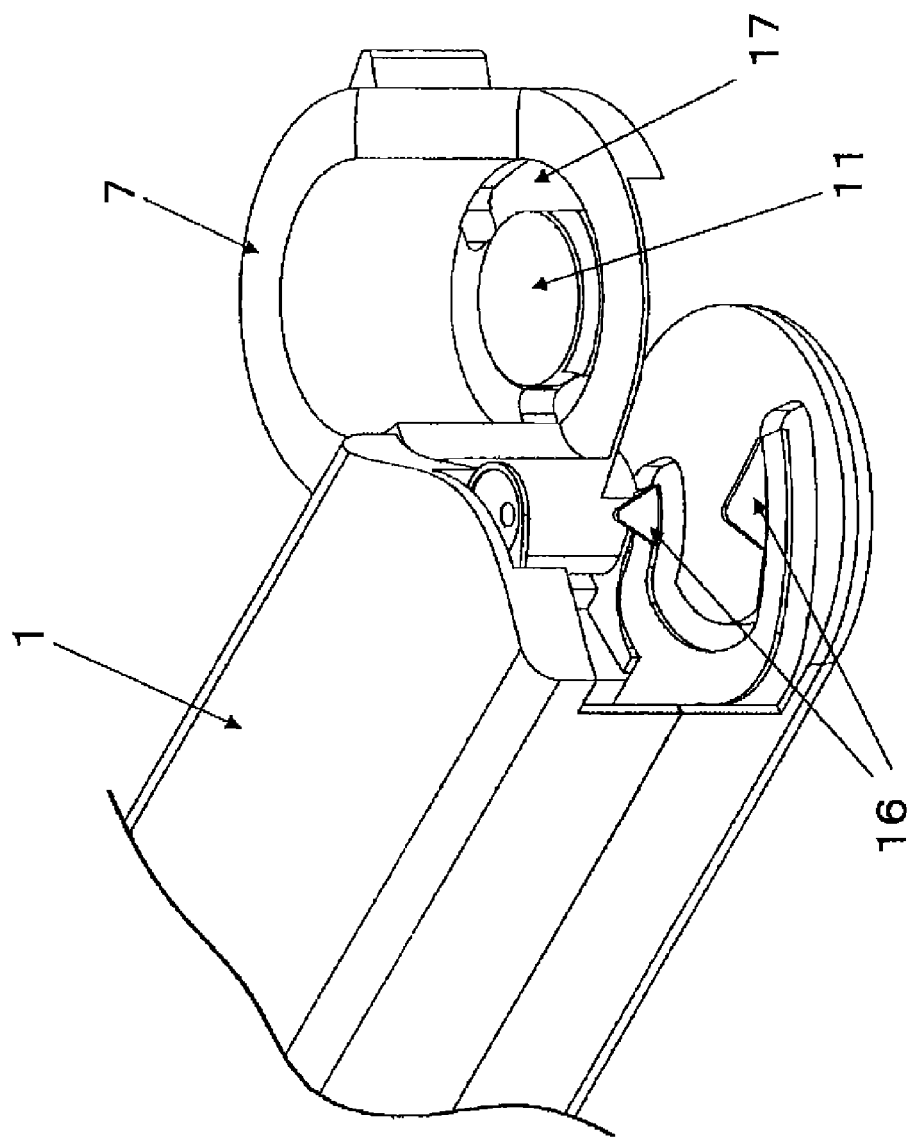
FIG. 6 is a diagram illustrating the inside of the battery case of the hearing aid in FIG. 1.

As shown in FIG. 6, the electrical contact 16 is substantially U-shaped, and has substantially triangular protrusions at both ends.

The magnet 11 is disposed in the middle of the bottom part of the battery case 7, and a groove 17 is provided around the magnet 11 for contact with the electrical contact 16 and the air battery 8.

The electrical contact 16 is configured so as to bend downward. When the battery case 7 is placed inside the main body case 1, first the electrical contact 16 is pushed down by the bottom of the battery case 7, after which the battery case 7 is pushed farther in and the bending is eliminated as it fits into the groove 17. At this point the air battery 8 is pushed up as shown in FIG. 5b by the electrical contact 16. The air battery 8 therefore enters a state in which it is separated from the magnet 11. As a result, the air holes 10 are opened up and the air battery 8 begins generating power, and power begins to flow to the control device 14.

In other words, with the hearing aid in this embodiment, the electrical contact 15 and the electrical contact 16 are used as switching portion.

Figure 3:
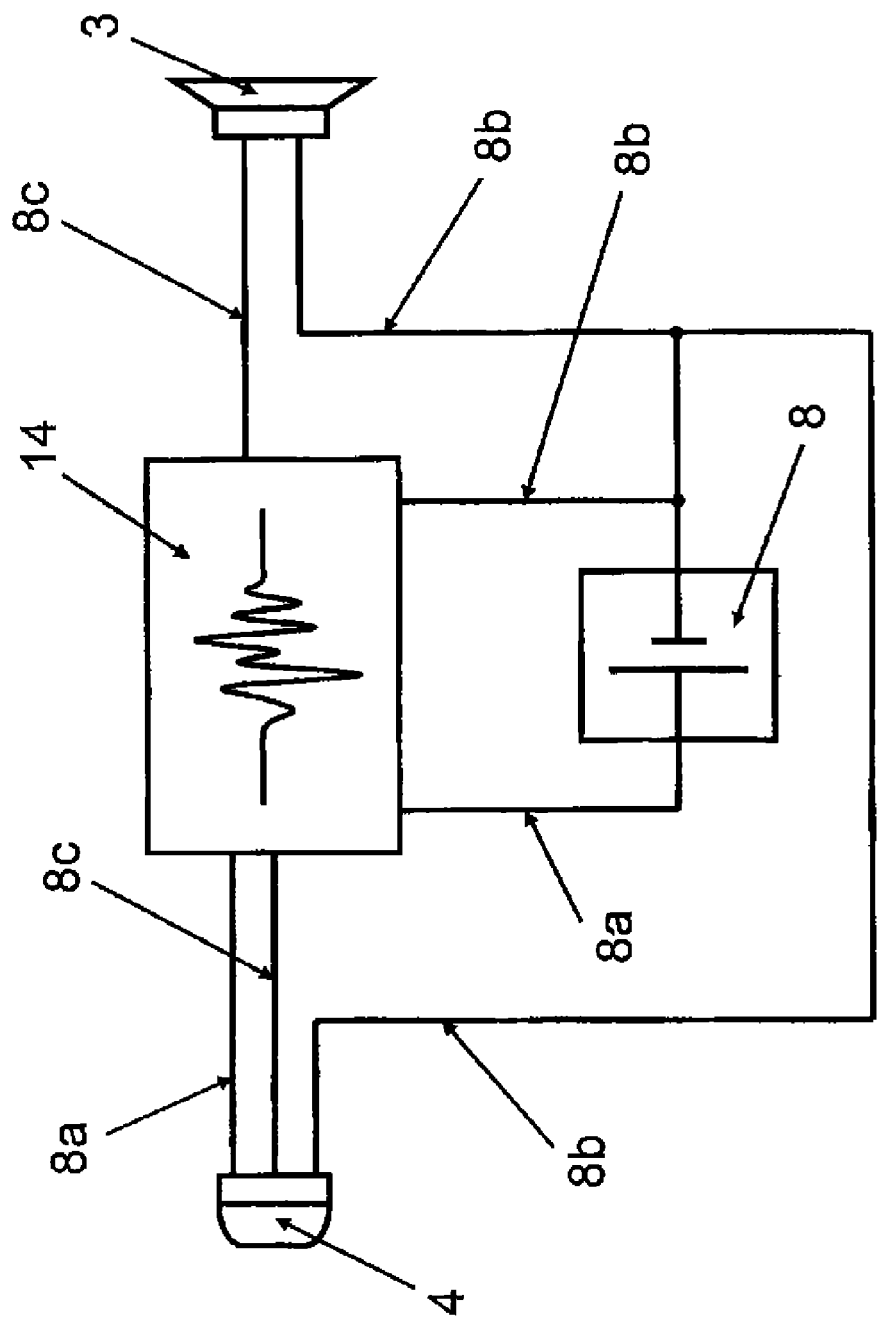
FIG. 3 is a control block diagram of the hearing aid in FIG. 1.

As shown in FIG. 3, in the control device 14, the microphone 4 and speaker 3 are electrically connected via a power wire 8a, a ground wire 8b, and a signal wire 8c.

With the hearing aid of this embodiment, as discussed above, power generation by the air battery 8 is suppressed by blocking off the air holes 10 with the magnet 11 by a simple manipulation that merely entails pulling a part (the lever 9) of the battery case 7 that is large enough to be grasped by the fingers, out of the main body case 1.

Consequently, the air holes 10 in the air battery 8 are automatically blocked off by the magnet 11 when a part (the lever 9) of the battery case 7 that is easy to manipulate by a hearing aid user, such as an elderly person, is manipulated, so a decrease in battery capacity when the hearing aid is not being used can be suppressed. And of course, the flow of power from the air battery 8 to the control device 14, the microphone 4, and the speaker 3 is also cut off at this point. Accordingly, there will be less of a decrease in battery capacity attributable to the flow of power to the control device 14, etc., when the hearing aid is not in use.

Embodiment 2

The hearing aid pertaining to another embodiment of the present invention will now be described through reference to FIGS. 7 to 9.

Figure 7:
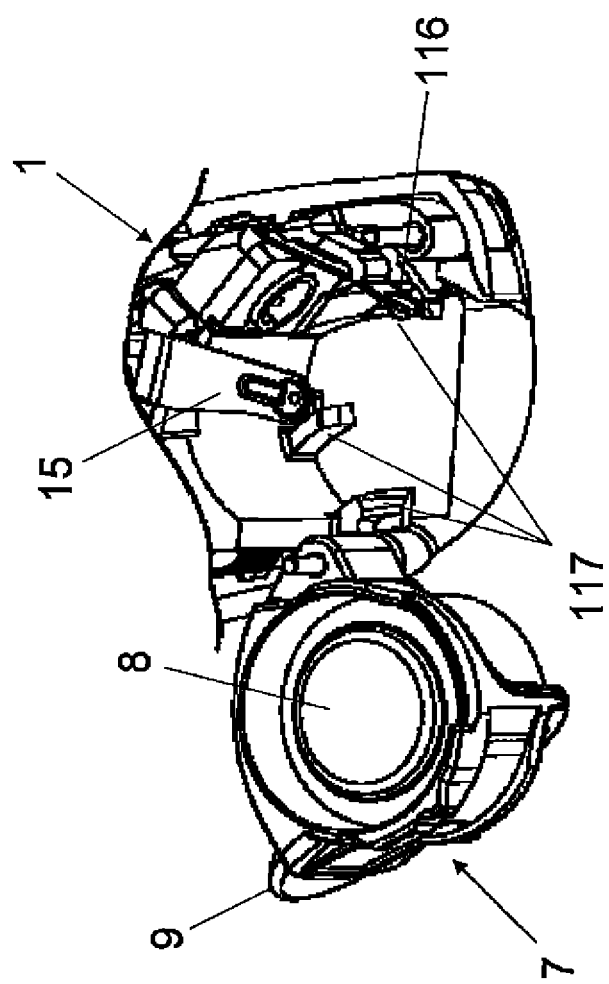
FIG. 7 is an oblique view of the state when the battery case of the hearing aid pertaining to another embodiment of the present invention has been opened.

As shown in FIG. 7, the hearing aid in this embodiment is such that an electrical contact 116 that touches the positive pole side of the air battery 8 is provided at a position where it touches the outside face of the air battery 8, and differs in this respect from the hearing aid in Embodiment 1 above, which comprised the electrical contacts 15 and 16 that touched the upper and lower faces of the air battery 8. Another difference from the hearing aid in Embodiment 1 above is that biasing force imparting protrusions 117 are provided instead of the electrical contact 16 as the means for biasing the air battery 8 to the electrical contact 15 side on the negative pole side.

This embodiment is the same as the hearing aid in Embodiment 1 other than in the above respects, and those components that have the same function, the same shape, and so forth will be numbered the same and will not be described again.

Specifically, as shown in FIG. 7, with the hearing aid in this embodiment the electrical contact 116 that touches the positive pole of the air battery 8 is provided at a position where it touches the side face of the air battery 8, rather than the bottom face side. In this embodiment, three biasing force imparting protrusions 117 are provided at positions opposite the bottom face of the air battery 8 within the main body case 1 in a state in which the battery case 7 has been closed.

In this embodiment, an example was described in which three of the biasing force imparting protrusions 117 were provided, but the present invention is not limited to this, and one, two, or four or more biasing force imparting protrusions may be provided, for example.

The electrical contact 116 is provided on the substantially cylindrical outer peripheral face side that forms a space for holding the battery case 7 inside the main body case 1. Therefore, the electrical contact 116 touches the side face (positive pole) of the air battery 8 in a state in which the battery case 7 is closed.

As shown in FIG. 7, the biasing force imparting protrusions 117 are provided around the outer periphery on the substantially cylindrical bottom face side that forms a space for holding the battery case 7 inside the main body case 1. Also, the biasing force imparting protrusions 117 are formed so that the base portions linked to the main body case 1 are thicker, and gradually thin towards the distal ends. Therefore, when the battery case 7 is closed, the bottom face of the air battery 8 rides up from the distal end side of the biasing force imparting protrusions 117, and the air battery 8 is lifted up.

In other words, in the above Embodiment 1, the electrical contact 16 on the positive pole side was used as the means for imparting biasing force toward the electrical contact 15 side to the air battery 8, but in this embodiment, the electrical contact 116 on the positive pole side is provided on the outer peripheral face side of the air battery 8, so the biasing force imparting protrusions 117 are provided independently as the above-mentioned means for imparting biasing force.

Figure 8:
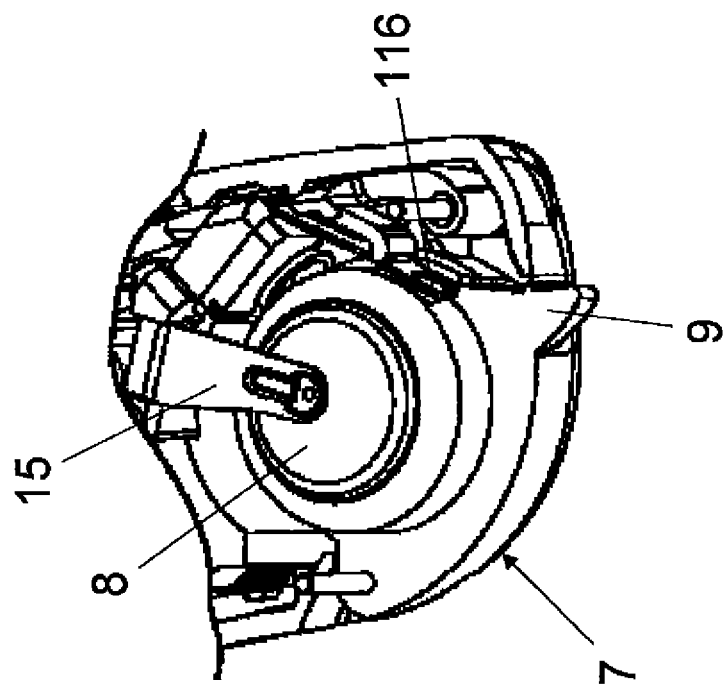
FIG. 8 is an internal oblique view of the state when the battery case of the hearing aid in FIG. 7 has been closed.
Figure 9:
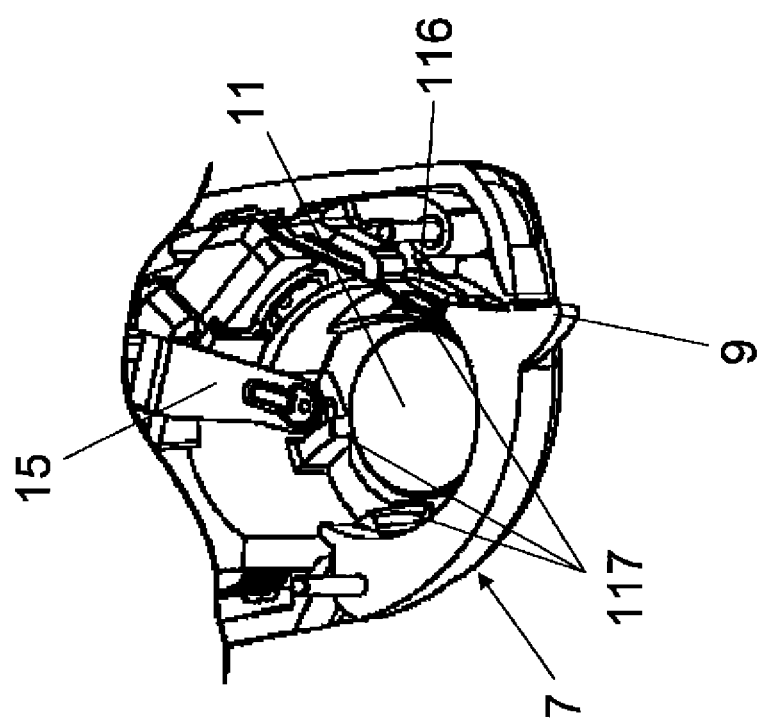
FIG. 9 is an internal oblique view of the state when the air battery in FIG. 8 has been removed.

Consequently, as shown in FIG. 8, with the hearing aid in this embodiment, in a state in which the battery case 7 is closed, the air battery 8 is biased to the electrical contact 15 side and lifted up by the biasing force imparting protrusions 117, so the upper face (negative pole) of the air battery 8 and the electrical contact 15 come into contact, and a gap is formed between the bottom face of the air battery 8 and the magnet 11 provided to the bottom face of the battery case 7 (see FIG. 9).

Thus, just as with the hearing aid in Embodiment 1 above, in the usage state of the hearing aid, the air holes 10 formed on the bottom face side of the air battery 8 will be opened up and not blocked off by the magnet 11, so power generation by the air battery 8 begins.

Meanwhile, when the hearing aid is not in use, just as with the hearing aid in Embodiment 1 above, a part (the lever 9) of the battery case 7 that is easy for a hearing aid user (such as an elderly person) to manipulate is manipulated to pull the battery case 7 out of the main body case 1, which automatically blocks off the air holes 10 in the air battery 8 with the magnet 11, so the decrease in battery capacity when the hearing aid is not in use can be suppressed. Also, the flow of power from the air battery 8 to the control device 14, the microphone 4, and the speaker 3 is of course also cut off at this point. Therefore, there will be less of a decrease in battery capacity attributable to the flow of power to the control device 14, etc., when the hearing aid is not in use.

INDUSTRIAL APPLICABILITY

With the present invention, the supply of power from the air battery to the control device and so forth can be cut off by the switching portion, and the air holes in the air battery can be covered by a magnet, merely by pulling at least part of the battery case, which is large enough to be grasped with the fingers, out of the main body case. Therefore, a decrease in the capacity of the air battery while the hearing aid is not in use can be suppressed, and the hearing aid is more convenient to operate when being put away, so the present invention is expected to find wide application in hearing aids in which an air battery is installed.

REFERENCE SIGNS LIST 1 main body case
2 ear hook
3 speaker
4 microphone
5, 6 opening
7 battery case
8 air battery
8a power wire
8b ground wire
8c signal wire
9 lever
10 air hole
11 magnet
14 control device
15, 16 electrical contact
17 groove
116 electrical contact
117 biasing force imparting protrusion

The invention claimed is:

1. A hearing aid, comprising:
a main body case;
a battery case that houses an air battery and that is provided so that it can be pulled from inside the main body case to outside of the main body case;
a control device that is actuated by electromotive force of the air battery housed in the battery case;
a microphone and speaker electrically connected to the control device;
switching portion configured to cut off the supply of power from the air battery to the control device in conjunction with manipulation that pulls at least part of the battery case out of the main body case;
a magnet that closes off the air holes of the air battery in conjunction with manipulation that pulls at least part of the battery case out of the main body case; and
a protrusion that biases the air battery away from the magnet in a state in which the battery case is housed in the main body case.

2. The hearing aid according to claim 1, wherein the magnet is provided to the bottom part of the battery case.

3. The hearing aid according to claim 1, wherein the protrusion is provided to a portion housing the battery case holder inside the main body case.

4. The hearing aid according to claim 1, wherein the protrusion is an electrical contact provided on the positive pole side of the air battery for sending power to the control device.

5. A hearing aid, comprising:
a main body case;
a battery case that houses an air battery and that is provided so that it can be pulled from inside the main body case to outside of the main body case;
a control device that is actuated by electromotive force of the air battery housed in the battery case;
a microphone and speaker electrically connected to the control device;
switching portion configured to cut off the supply of power from the air battery to the control device in conjunction with manipulation that pulls at least part of the battery case out of the main body case;
a suction portion that closes off the air holes of the air battery in conjunction with manipulation that pulls at least part of the battery case out of the main body case; and
a protrusion that biases the air battery away from the suction portion in a state in which the battery case is housed in the main body case.

* * * * *